United States Patent
Wong et al.

(10) Patent No.: US 6,501,483 B1
(45) Date of Patent: Dec. 31, 2002

(54) METHOD AND APPARATUS FOR ANTIALIASING USING A NON-UNIFORM PIXEL SAMPLING PATTERN

(75) Inventors: Daniel Wong, North York; Milivoje M. Aleksic, Richmond Hill, both of (CA)

(73) Assignee: ATI Technologies, Inc., Ontario (CA)

( * ) Notice: Subject to any disclaimer, the term of this patent is extended or adjusted under 35 U.S.C. 154(b) by 0 days.

(21) Appl. No.: 09/087,779

(22) Filed: May 29, 1998

(51) Int. Cl.[7] ............................................. G06F 15/00
(52) U.S. Cl. ..................... 345/611; 345/441; 345/442; 345/581; 345/612; 345/613; 345/614; 345/687; 382/254; 382/266; 382/267; 382/269; 382/272
(58) Field of Search ................................. 345/611, 441, 345/442, 581, 612, 613, 614, 687; 382/254, 266, 267, 272, 269

(56) References Cited

U.S. PATENT DOCUMENTS

| | | | | |
|---|---|---|---|---|
| 4,918,626 A | * | 4/1990 | Watkins et al. | 395/121 |
| 5,287,438 A | * | 2/1994 | Kelleher | 395/132 |
| 5,386,509 A | * | 1/1995 | Suzuki et al. | 395/523 |
| 5,594,854 A | * | 1/1997 | Baldwin et al. | 395/141 |
| 5,757,375 A | * | 5/1998 | Kawase | 345/429 |
| 5,856,829 A | * | 1/1999 | Gray, III et al. | 345/422 |
| 5,929,862 A | * | 7/1999 | Barkans | 345/431 |

* cited by examiner

Primary Examiner—Bipin Shalwala
Assistant Examiner—Vincent E. Kovalick
(74) Attorney, Agent, or Firm—Vedder, Price, Kaufman & Kammholz

(57) ABSTRACT

The invention provides a method and apparatus for an anti-aliasing process that allows for super-sampling at a high subpixel resolution, but does not require the process and memory resources typically required for conventional super-sampling at this subpixel resolution. Each pixel is partitioned into an array that provides for a large number of subpixels, and a smaller set of super-samples from this set of subpixels are sampled and used to determine the resultant pixel values. Because the set of super-samples is substantially smaller in number (less than half) than the number of subpixels, the processing and memory requirements are substantially reduced. The set of super-samples are preferably determined so as to provide for a uniform sampling frequency in each of the major axes, and along each diagonal, even though the super-samples may not provide an uniform sampling of each pixel area.

17 Claims, 10 Drawing Sheets

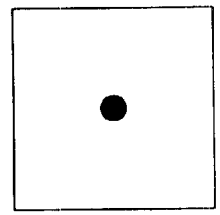
FIG. 1A — 1 sample per pixel
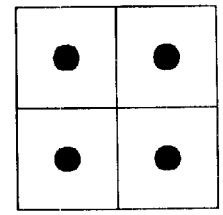
FIG. 1B — 4 samples per pixel
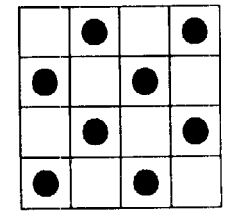
FIG. 1C — 8 samples per pixel
[ Prior Art ]
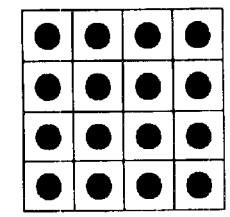
FIG. 1D — 16 samples per pixel
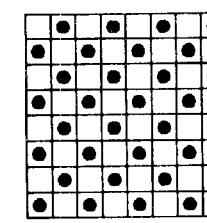
FIG. 1E — 32 samples per pixel
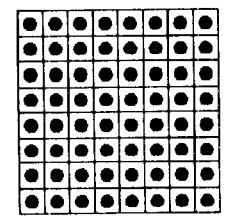
FIG. 1F — 64 samples per pixel

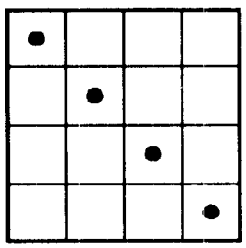 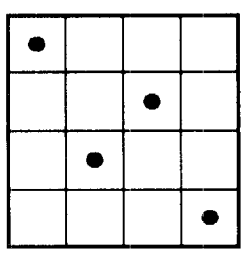 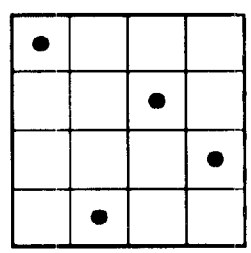
FIG. 5A    FIG. 5B    FIG. 5C
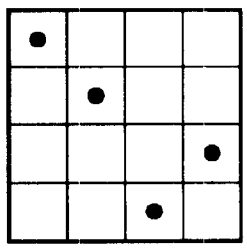 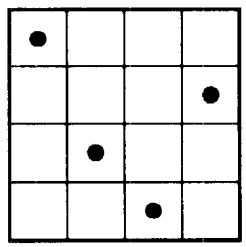 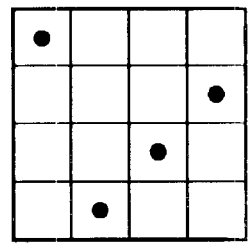
FIG. 5D    FIG. 5E    FIG. 5F
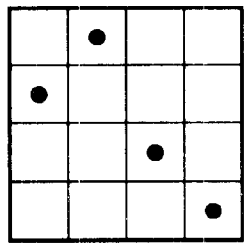 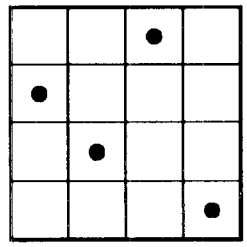 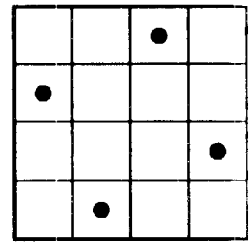
FIG. 5G    FIG. 5H    FIG. 5I
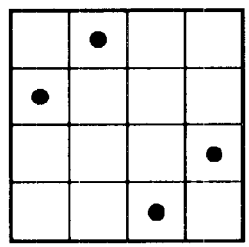 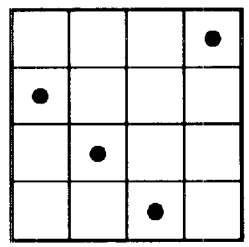 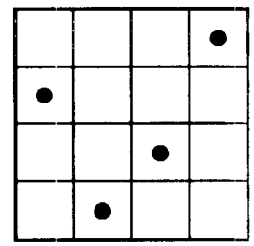
FIG. 5J    FIG. 5K    FIG. 5L

METHOD AND APPARATUS FOR ANTIALIASING USING A NON-UNIFORM PIXEL SAMPLING PATTERN

FIELD OF THE INVENTION

This invention relates in general to the field of computer graphics, and in particular to the processing of images to reduce the aliasing effects of pixel sampling.

BACKGROUND OF THE INVENTION

Computers are known to include processors, memory, and display devices. With ever increasing advances in computer applications, the need for improved display quality continues. Computer displays must be able to present high resolution, high quality images at rapid refresh rates. Video graphic circuits and systems must be able to provide the data for such displays efficiently and effectively, often within highly competitive cost and compatibility constraints.

Computer displays, and other high resolution display devices such as high definition televisions (HDTV), projectors, printers, plotters, and the like, present an image to the viewer as an array of individual picture elements, or pixels. The individual pixels are each given a specific characteristic, such as the color of the image at the particular pixel's location. The pixels are closely spaced, and the viewer's visual system performs a filtering of the individual pixel color values to form a composite image. If the partitioning of the image into individual pixel elements is performed properly, and the pixels are close enough together, the viewer perceives the displayed array of pixels as a virtually continuous image. Despite the viewer's visual filtering, the viewer remains sensitive to aberrations in the image, and video graphic systems must be designed to minimize these aberrations.

If the image is insufficiently sampled, visual aberrations will be produced. A highly detailed image with numerous changes within a short span of points will have a high frequency of change; a blank image has a zero frequency of change. If the frequency of pixel value sampling is less than twice the image's frequency of change, aliasing will occur, and visual aberrations will be introduced into the image. That is, not only will the displayed image not contain the detail of the original image, but additional components, not contained in the original image, will be added. In addition to being visually disturbing, the introduction of sampling artifacts, not contained in the original image, can be particularly problematic if the display is used for mapping or medical applications (x-rays, MRI scans, etc.)

Aliasing will occur whenever the sampling rate is less than twice the highest frequency change in the image. Traditionally, the pixel sampling rate is equal to the pixel spatial frequency. That is, if there are 640 pixels per line of display, a full screen image will be sampled at 640 points across its horizontal dimension. If the image being sampled has a highest frequency that is greater than half the pixel sampling rate, then either the image highest frequency must be reduced, or the pixel sampling rate must be increased. These techniques, of reducing the image frequency, or increasing the pixel sampling frequency, are termed "antialiasing" techniques. Filtering the image to remove the high frequency components before the image is sampled for display reduces the image highest frequency. Increasing the number of pixels per line of display, i.e. increasing the display resolution, increases the pixel sampling rate. High resolution displays, however, are significantly more costly than lower resolution displays. A preferred alternative for increasing the number of pixel samples per line is to obtain multiple samples of the image within each pixel; that is, by super-sampling at a subpixel resolution. The value presented to the display as the pixel value corresponding to the image will be the average of the multiple sample values obtained within each pixel.

To effect super-sampling, multiple points within each pixel are selected as sampling points, and the image is sampled at each of these points. To display the pixel, a single value is assigned, based on a composite of the multiple super-samples. Typically, the single value determined for a pixel will be the average of the values assigned at each super-sampled point within the pixel, although other means of forming a representative statistic may be employed. The averaging of the super-samples has the effect of reducing the high-frequency changes in the image. Consider, for example, a pixel that lies on the border of two objects, such that some of the super-sampled values contain the first object's value, and some contain the other object's value. The pixel will be assigned an average value of the sampled values, producing a smoothing, or blending at the transition between the two objects, thereby effectively reducing the high frequency components of the image.

The super-samples are conventionally uniformly distributed about the pixel area, thereby assuring that the average is an unbiased estimate of the object values within the pixel area. To obtain 4 super-samples per pixel, the pixel is divided into a 2×2 grid, forming 4 subpixels, and each super-sample value is obtained at the center of each subpixel. Similarly, to obtain 16 super-samples per pixel, the pixel is divided into a 4×4 grid, forming 16 subpixels. FIGS. 1A–1E illustrate, respectively, subpixel partitionings for providing for 1, 4, 8, 16, 32, and 64 super-samples per pixel in a conventional super-sampling process. The number of subpixels per pixel is termed the subpixel resolution. Each pixel is sampled at each of the subpixels identified by dots in FIGS. 1A–1E. Because the dots are uniformly distributed, a uniform sampling frequency is assured.

Because super-sampling effectively increases the sampling frequency, super-sampling provides an effective anti-aliasing solution, but it requires significant additional processing and memory resources. Consider, for example, a common 640×480 pixel display, wherein each pixel is super-sampled based on a 4×4 subpixel resolution (FIG. 1C). For each of the 307,200 (640*480) pixels, 16 sample values will be determined, each requiring data access and computation time and resources. In three-dimensional graphics, because one object may block another from view, it often cannot be determined which objects are visible until all the objects are processed, and therefore, in general, the 16 sample values for each of the 307,200 pixels must be stored. The composite value for each pixel is determined from these stored values after all the objects in the image are processed, requiring a substantial number (16 * 307,200) of data accesses to form the composite image. With an ever increasing need to improve video graphic processing speed while at the same time reducing costs, the significant amount of processing and storage required for subpixel sampling places a limit on the practical application of this anti-aliasing technique.

Therefore, a need exists for an anti-aliasing technique that provides the anti-aliasing qualities of a high super-sampling frequency, but does not incur a correspondingly high computation and memory resource requirement increase. A need also exists for a technique for storing super-samples that minimizes data access time.

BRIEF DESCRIPTION OF THE DRAWINGS

FIGS. 1A–1F illustrates subpixel resolutions that provide for 1, 4, 8, 16, 32, and 64 uniformly distributed super-samples within a pixel area.

FIGS. 5A–5M each illustrates a sampling pattern at a 4×4 subpixel resolution that provides for 4 non-uniformly distributed super-samples within a pixel area in accordance with this invention.

DETAILED DESCRIPTION OF PREFERRED EMBODIMENTS

Generally, the invention provides a method and apparatus for an anti-aliasing process that allows for super-sampling at a high subpixel resolution, but does not require the process and memory resources typically required for conventional super-sampling at this subpixel resolution. Each pixel is partitioned into an array that provides for a large number of subpixels, and a smaller set of super-samples from this set of subpixels are sampled and used to determine the resultant pixel value. Because the set of super-samples is substantially smaller in number (less than half) than the number of subpixels, the processing and memory requirements are substantially reduced. The set of super-samples are preferably determined so as to provide for a uniform sampling frequency in each of the major axes, and along each diagonal, even though the super-samples may not provide an uniform sampling of each pixel area. That is, relative to each pixel, the super-samples may be nonuniform, but relative to the overall image being produced, they provide a substantially uniform sampling pattern. In this manner, the benefits of high resolution antialiasing, relative to the overall image, are achieved with a substantial reduction in the memory and processing requirements to effect this high-resolution anti-aliasing.

Figure 2A:
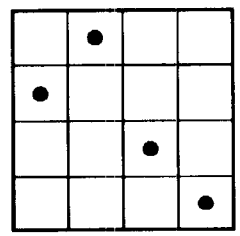
FIGS. 2A–2B illustrate a sampling pattern at a 4×4 subpixel resolution that provides for 4 non-uniformly distributed super-samples within a pixel area in accordance with this invention.

A uniform sampling of an object that extends into a pixel area will provide a number of samples of the object in proportion to the extent of the area into which the object extends. That is, if the object covers between a quarter and half of the pixel area, one would expect that between one quarter and one half of the super-samples would include the object's value. FIG. 2A illustrates a super-sampling of 4 samples per pixel, based upon a 4×4 subpixel partitioning that is non-uniform. In FIG. 2A, objects that extend partially into the upper right or lower left of the pixel area will not contain super-sample points, and will not be sampled. Objects that extend partially into the upper left or lower right of FIG. 2A, however, will contain super-sample points, and will be sampled. The object values in the upper right or lower left regions will not be reflected in the average of the super-samples. Thus, the determined value of the pixel for display will be biased in favor of objects that extend into the upper left and lower right of the pixel area.

As discussed above, to avoid a bias in the average pixel value, a super-sampling of 4 samples per pixel is conventionally effected by uniformly distributing the sample points within a 2×2 subpixel resolution grid, as shown in FIG. 1B. It has been empirically determined, however, that a super-sampling of 4 non-uniformly distributed samples per pixel from a 4×4 subpixel partitioning can provide for a more visually appealing overall image than a super-sampling of 4 uniformly distributed samples per pixel from a 2×2 subpixel partitioning. Because of the higher subpixel resolution, the sampling at a 4×4 subpixel resolution effectively provides a better antialiasing effect than the 2×2 subpixel partitioning, albeit at the cost of some individual pixel values being biased based upon the pixel sampling pattern. This effect can best be appreciated with reference to the super-sampling patterns that are produced relative to the overall image, rather than relative to each pixel, as will be discussed below.

Figure 2B:
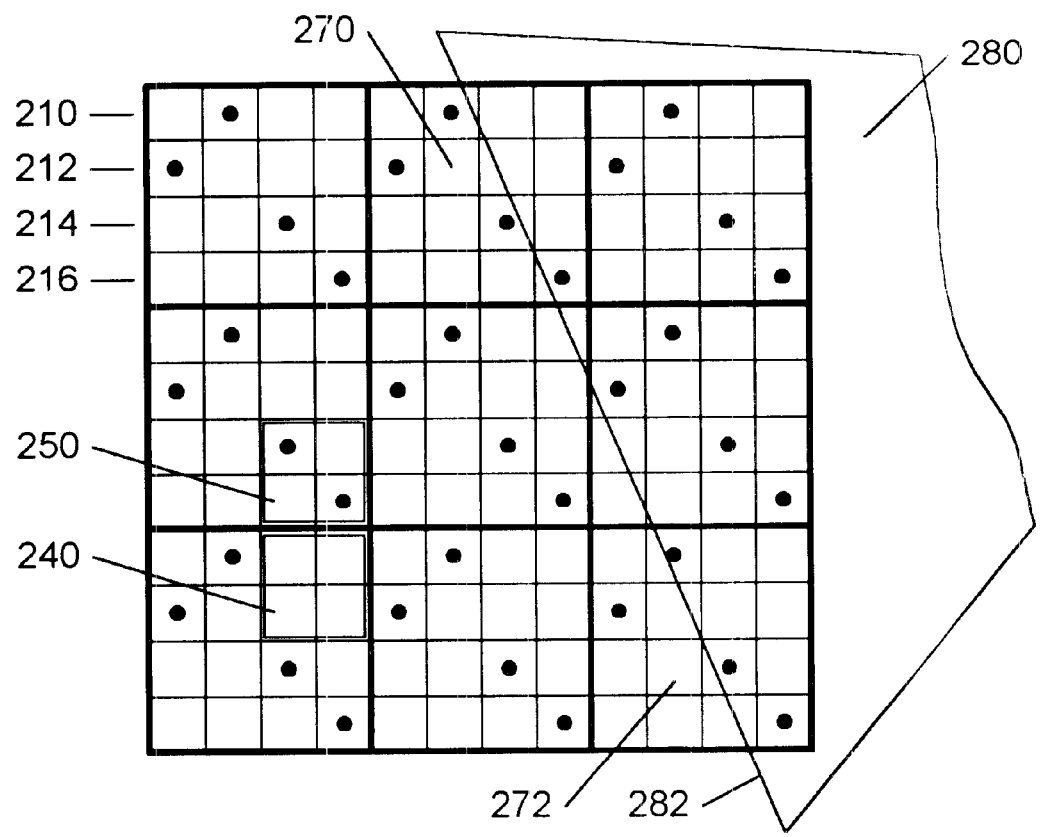

FIG. 2B shows 9 pixels arranged in a 3×3 area, with super-sampling points within each pixel corresponding to the sampling pattern of FIG. 2A. Due to the non-uniform sampling of FIG. 2A, there are areas, for example the area identified as 250, that have more sampling points than others, for example the area identified as 240. Note, however, that although FIG. 2A was shown to exhibit a bias in favor of objects that extend into the upper left and lower right of the pixel area, the composite of multiple pixels in FIG. 2B does not necessarily exhibit such a bias. An object that extends into the area illustrated in FIG. 2B will, overall, include a fraction of the sampling points that approximately corresponds to the fraction of the area in which the object extends. Shown in FIG. 2B is an object 280, having an edge, 282, that extends across a portion of the 9 pixels. Note that the object 280 covers a large portion of the pixel labeled 270, but only covers one of the four super-sample points in the pixel 270; as such, pixel 270's average super-sampled value will not reflect an appropriate portion of the object 280's value. Conversely, the object 280 covers only half of pixel 272's area, but contains 3 out of 4 of the super-sample points; as such, pixel 272's average value will overly reflect object 280's value. Overall, however, the object 280 covers approximately a third of the pixels of FIG. 2B, and contains a third of the super-sample points. That is, although some of the pixel values may be an inaccurate representation of the average value of the objects contained within the pixel, the image is suitably sampled so as to produce an accurate representation overall. Because the sampling of FIG. 2A provides for some areas 250 that have a higher sampling density than the conventional 2×2 sampling of FIG. 1B, the sampling of FIG. 2B provides a higher resolution antialiasing effect that is visually more appealing than the convention 2×2 partitioning that provides for 4 uniformly spaced super-samples.

Figure 3A:
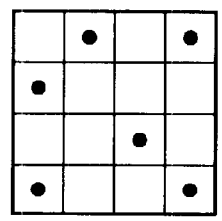
FIGS. 3A–3B illustrate a sampling pattern at a 4×4 subpixel resolution that provides for 6 non-uniformly distributed super-samples within a pixel area in accordance with this invention.
Figure 3B:
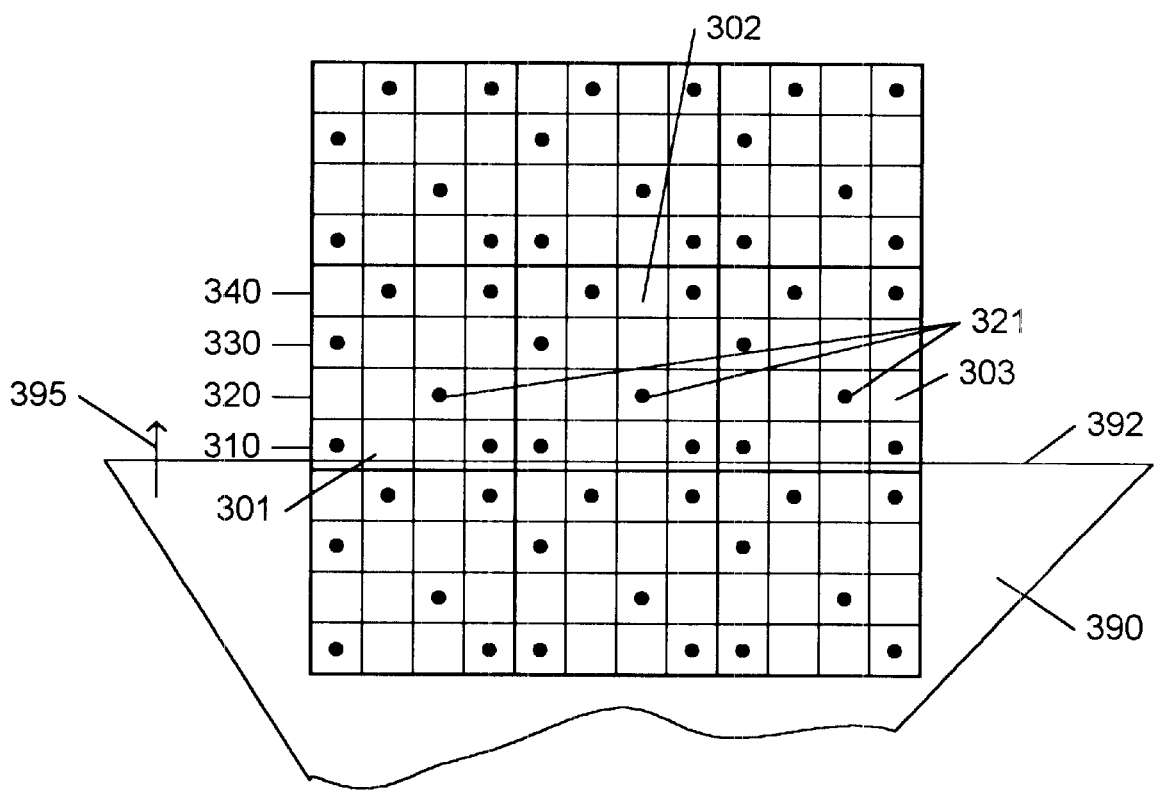
Figure 4A:
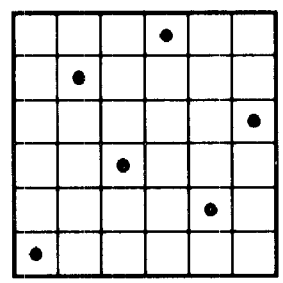
FIGS. 4A–4B illustrate a sampling pattern at a 6×6 subpixel resolution that provides for 6 non-uniformly distributed super-samples within a pixel area in accordance with this invention.
Figure 4B:
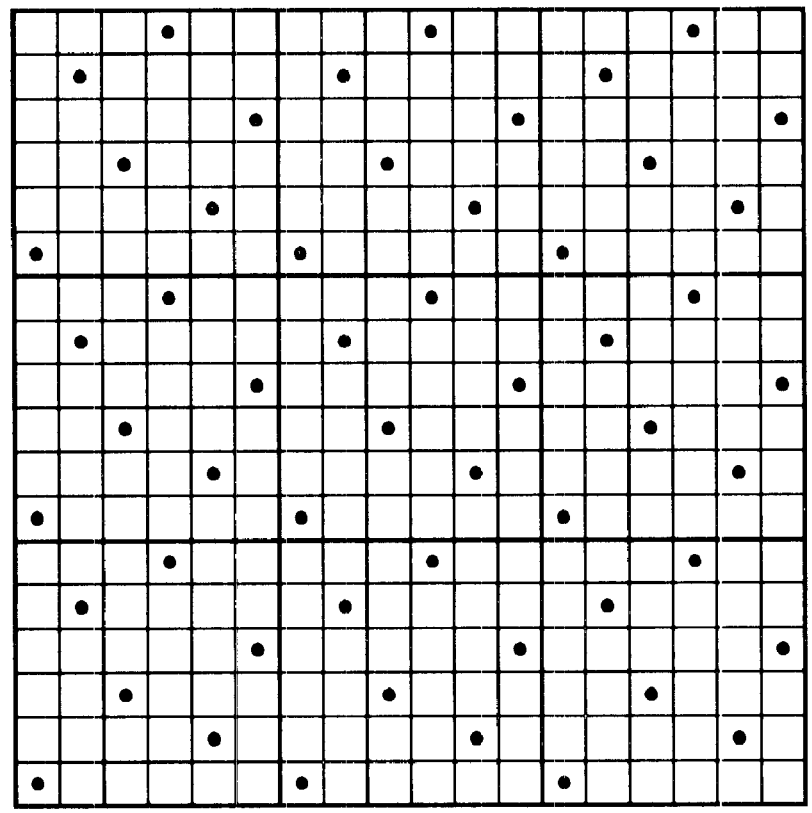

The principles presented thus far are not limited to a particular relationship between the super-sampling pattern and the subpixel resolution. FIG. 3A illustrates a nonuniform distribution of 6 super-samples from a 4×4 subpixel resolution grid, and FIG. 3B illustrates a set of 9 pixels having this non-uniform super-sampling pattern. Likewise, FIG. 4A illustrates a nonuniform distribution of 6 super-samples from a 6×6 subpixel resolution grid, and FIG. 4B a corresponding set of 9 pixels having this non-uniform super-sampling pattern. As can be seen, although the super-sampling at the pixel level is non-uniform (FIGS. 3A, 4A), the super-sampling pattern relative to an arrangement of multiple pixels is substantially uniform (FIGS. 3B, 4B).

By selecting the number of super-samples to be equal to a multiple of the number of rows or columns of a square subpixel resolution grid, the super-sample pattern can be designed so as to provide for a uniform horizontal and vertical sampling frequency. That is, for example, along each row and column of FIG. 4B, the super-sample points are spaced 6 subpixels apart. Equal horizontal and vertical sampling frequencies are preferred so as to avoid variations along edges that run substantially horizontally or vertically. FIG. 3B does not exhibit a consistent horizontal or vertical sampling frequency. Rows 310, 320, 330, and 340 in FIG. 3B, for example, are each equally spaced, but will produce differing visual effects. Consider, for example, an object 390 that has a horizontal edge 392 that is being moved over the area of FIG. 3B in a vertical direction 395. For ease of understanding, assume that the object 390 is black, having a value of B, and the background is white, having a value of 0. The average pixel values can assume a series of gray values between 0 and B. As the object 390 moves up 395 to cover row 310, two super-samples, of the total of 6 super-samples in each pixel 301, 302, 303 in the row, will be contained in the object 390. The average pixel value of the pixels 301, 302, and 303 will be (2*B+4*0)/6 when the object 390 covers row 310. When the object 390 covers row 320, one additional super-sample 321 of each pixel 301, 302, 303 will be included within the object 390, and the average pixel value increases by B/6. Similarly, the average value increases by B/16 when the object 390 covers row 330. When the object 390 covers row 340, two more super-samples of each pixel 301, 302, 303 will be included within the object 390, increasing the average pixel value by 2*B/6. Thus, a uniform movement of the object 390 in the vertical direction 395 produces a nonuniform (B3, B/6, B/6, B/3) increase in the gray-ness of the horizontal pixels 301, 302, 303. Thus, although the super-sampling pattern of FIG. 3A provides an improved anti-aliasing effect, it may not be a suitable pattern to use in a system that routinely processes objects that move in the horizontal or vertical direction, if a nonuniform pixel change is objectionable. The pattern of FIG. 4A may be a preferable super-sampling pattern for 6 super-samples per pixel, because of its uniform sampling frequency in the horizontal and vertical directions. Note also that it is often preferred that the vertical and horizontal directions have the same sampling frequency. This assures that object changes or motions in each of these directions will have the same visual effect.

Figure 6A:
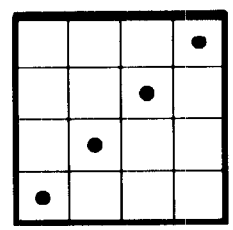
FIGS. 6A–6B illustrate another sampling pattern at a 4×4 subpixel resolution that provides for 4 non-uniformly distributed super-samples within a pixel area in accordance with this invention.

The determination of the appropriate super-sampling pattern to use is somewhat subjective. Given a desired degree of super-sampling (N, the number of super-samples per pixel), and the desired degree of subpixel resolution (M, the number of subpixels per pixel), one technique for determining an appropriate super-sampling pattern is to generate every possible permutation of M subpixels selected N at a time, then choose the one that provides the most uniform sampling of a multiple of pixels. If the horizontal and vertical sampling frequencies are bound to be uniform and equal, the number of possible combinations drops substantially, and can easily be generated. FIGS. 5A–5M, for example, illustrates 12 super-sampling patterns for obtaining 4 super-samples having uniform and equal horizontal and vertical sampling frequencies, based upon a 4×4 subpixel grid. There are a total of 24 (4*3*2*1) possible super-sampling patterns satisfying this criteria; the remaining twelve are vertically mirror inverted versions of FIGS. 5A–5M. For example, FIG. 6A is a vertically mirror inverted version of FIG. 5A. Although each of these patterns will provide for high-resolution antialiasing with a substantial reduction in memory and processing requirements, as discussed above, some of these patterns may not be suitable for all applications because of the non uniformity of sampling that may result in the combination of multiple pixels having this sampling pattern. Algorithmic statistical methods are available for determining the uniformity of sampling, but often a quick view will often eliminate those patterns which exhibit a bias at the multiple pixel level.

Figure 6B:
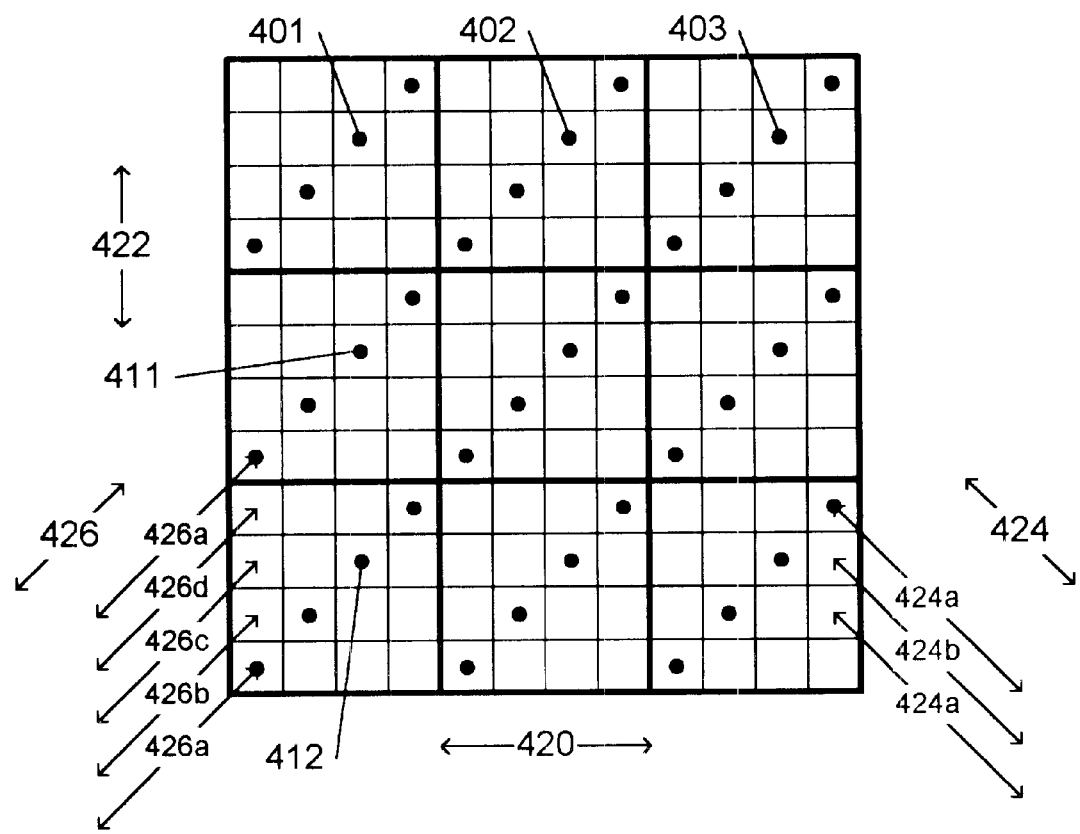

FIG. 6B shows 9 pixels arranged in a 3×3 area, with super-sampling points within each pixel corresponding to the sampling pattern of FIG. 6A. As can be seen, the non-uniform pixel sampling of FIG. 6A produces a non-uniform sampling pattern associated with the multiple pixels forming the overall image. That is, for example, although FIG. 6B exhibits an equal sampling frequency in the horizontal 420 and vertical 422 directions, it does not provide for equal sampling frequencies in each of the diagonal directions 424, 426. In the horizontal direction 420, along each row, the sampling points are equally spaced, four subpixels apart. For example, sampling point 403 is four subpixels beyond sampling point 402, which is four subpixels beyond sampling point 401. Similarly, in the vertical direction 422, along each column, the sampling points are also spaced four subpixels apart, as illustrated by the equal spacing of sampling points 401, 411 and 412. In diagonal direction 424, there are diagonals 424a that contain sample points, and diagonals 424b that do not contain sample points. Along each diagonal 424a, every other subpixel is sampled. In diagonal direction 426, there are diagonals 426a that contain sample points, and diagonals 426b, 426c, 426d, that do not contain sample points. Along diagonal 426a, every pixel is sampled. Overall, the pattern of FIG. 6A will provide for an effective sampling rate of four times the pixel sampling frequency in each direction, but the difference between sampling patterns along each diagonal can be less visually appealing than the pattern of FIG. 2A. An overall image that contains diagonal edges that run from upper right to lower left, along direction 426, will demonstrate abrupt changes along the diagonal, depending upon which side of the diagonal 426a the edge occurs. Once the diagonal 426a is included within the edge of the boundary, all the pixels along the diagonal 426a will be assigned the full value of the object along that edge, because each of the subpixels forming the diagonal 426a are sampled, and none of the subpixels forming diagonals 426b, 426c, and 426d are sampled. Conversely, an edge along the diagonal 424 contributes fractionally to the overall pixel value, as desired. If an object extends between a quarter and half into the pixel area along the diagonal 424, it will include one of the four super-sample points, and contribute ¼ to the overall average for the pixel value. If it extends just over half into the pixel area, it will include two of the four super-sample points, and contribute half to the average, etc. Thus, if uniform diagonal sampling is a significant factor in the choice of super-sample patterns, FIG. 6A would not be a preferred choice.

Note that patterns 5B, 5C, 5D, 5E, 5G, 5H, 5J, and 5M, and the vertically mirror inverted patterns corresponding to these patterns each produce a sampling pattern as shown in FIG. 2B or its vertically mirrored inversion, but with differing pixel bounds. Similarly, patterns 5A, 5F, 5K, and 5L, and the vertically mirror inverted patterns corresponding to these patterns each produce a sampling pattern as shown in FIG. 6B, or its vertical inverse, but with differing pixel bounds. That is, for example, FIG. 5F will produce the pattern of 6B, but the pixel bounds will be offset to the left by one subpixel. In general, the patterns that produce the sampling pattern of FIG. 2B or its vertical inverse are preferred, because they exhibit similar sampling patterns and frequencies along all orthogonal directions. That is, in FIG. 2B, the horizontal and vertical sampling frequencies are equal; the diagonal sampling frequencies are substantially equal to each other; and the sampling frequency in one direction is substantially equal to the sampling frequency in a direction perpendicular to that direction.

Figure 7:
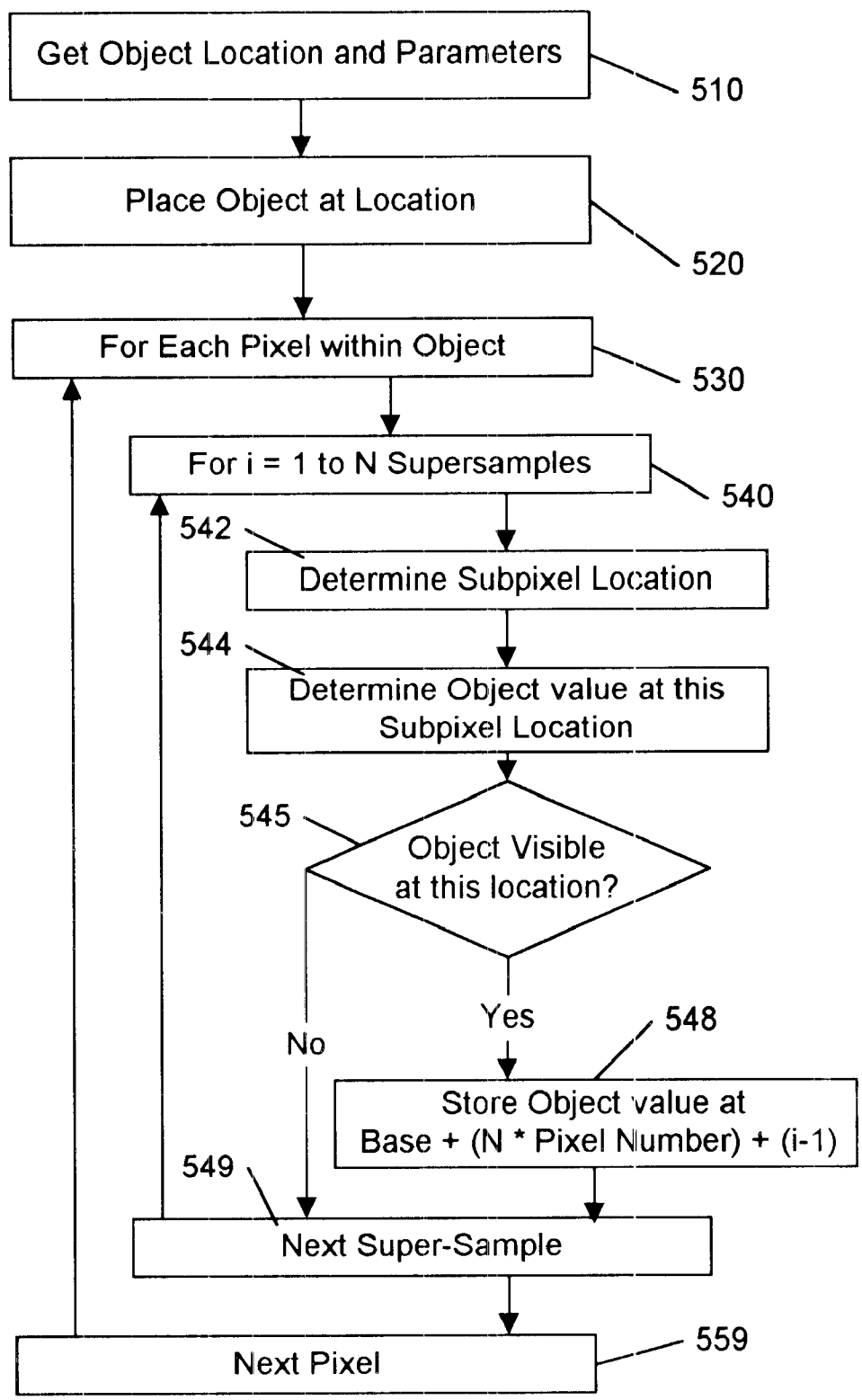
FIG. 7 illustrates a flowchart for non-uniform super-sampling in accordance with this invention.

FIG. 7 illustrates an example flowchart for rendering an object in accordance with this invention. At 510, the location and parameters of the object are obtained. The location of the object specifies where, within the array of pixels, the object is to be rendered, at 520. The object's parameters determine the extents of the object, and at 530, each pixel that is contained within the extents of the object is processed. Each super-sample within the pixel is processed in the loop 540–549. At 542, based upon the super-sample pattern utilized, the location of the subpixel associated with each super-sample is determined. That is, for example, if the pattern of FIG. 2A is utilized, the subpixels at grid coordinate locations (1,0),(0,1),(2,2), and (3,3) are associated with the first, second, third, and fourth super-samples, respectively. The value of the object at each super-sampled subpixel location is determined, at 544. In 3-D graphics processing, wherein one object may block the view of another object, the determination of the value of the object also includes the determination of whether the object is visible. If the object is visible at this subpixel location, the object value, for example, the color, texture, etc. of the object at this subpixel location, is stored as the super-sampled value, at 548. To facilitate the efficient retrieval of the super-sampled values, the super-sampled values are stored in contiguous memory locations, as shown by the use of the super-sample index, i, in the memory address equation at 548. After all the super-samples of the pixel are evaluated, at 549, the next pixel within the object is processed, at 559. As would be evident to one of ordinary skill in the art, if the visibility of the object is absolute, for example in 2-D image processing, the object's visibility need not be determined at 545 and the individual super-sample values need not be stored. In such an example, the blocks 545–548 are replaced by a single block that accumulates each super-sample's contribution to the average pixel value, and the average pixel value is stored directly.

Figure 8:
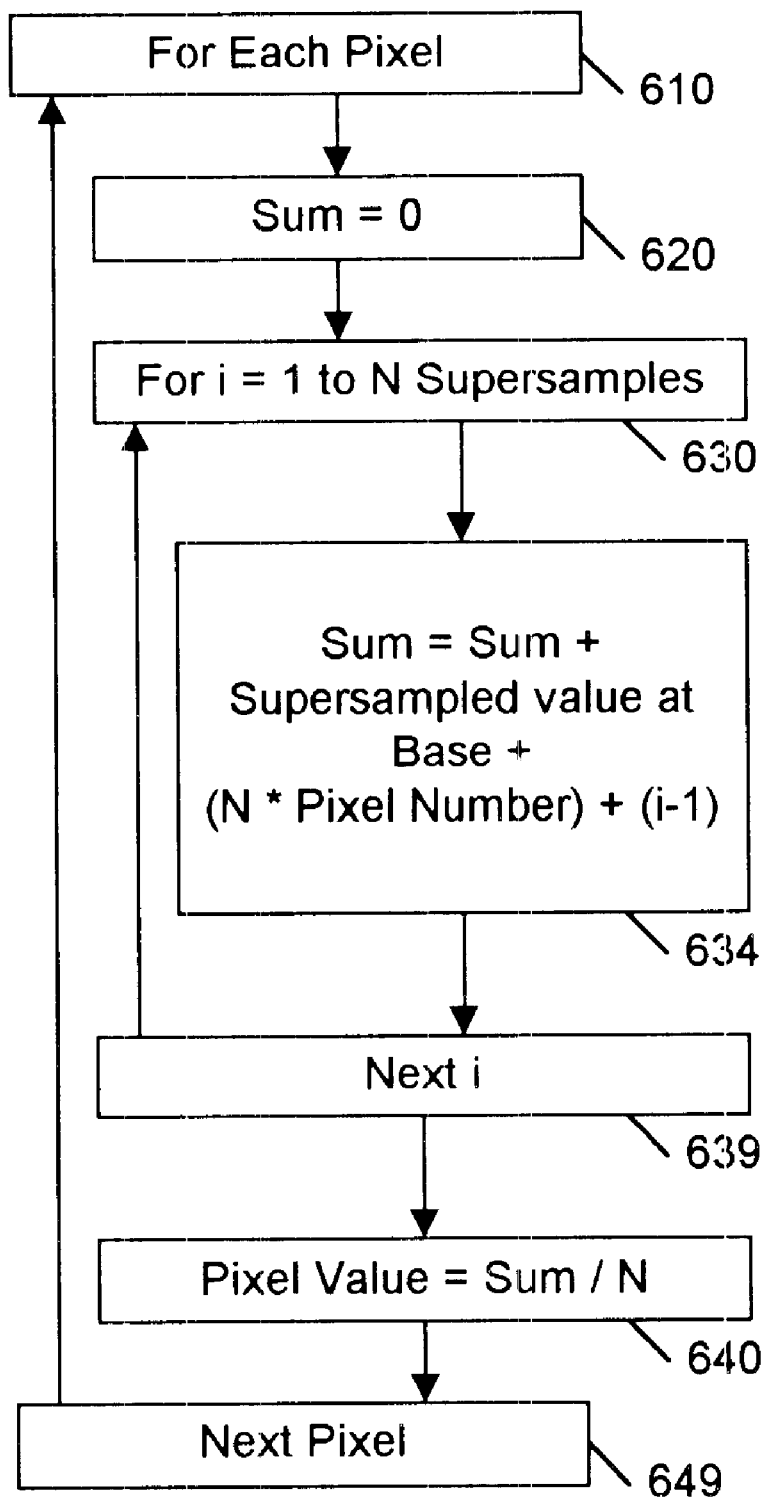
FIG. 8 illustrates a flowchart for determining a pixel value based upon a plurality of super-samples in accordance with this invention.

FIG. 8 illustrates an example flowchart for determining the average pixel value from the stored super-sample values. Each pixel forming the image is processed by the loop 610–649. For each pixel, an initial sum is set to zero, at 620, then the sum is incremented, at 634, by each stored super-sample value, via the loop 630–639. As discussed above, preferably, the super-sampled values are stored in contiguous memory locations, so that the loop 630–639 can be effected via a single memory block access, common to the art. At 640, the sum is divided by N, the number of super-samples per pixel, to determine the average pixel value. This average value may be rendered directly to a display device, or stored in memory for subsequent display. As would be evident to one of ordinary skill in the art, a number of optimizations may be applied to this process. For example, if N is a power of two, the division block of 640 could be a mere shift operation. Additionally, if the image is also being scaled, the divisor N of block 640 could be modified to effect such a scaling.

Figure 9:
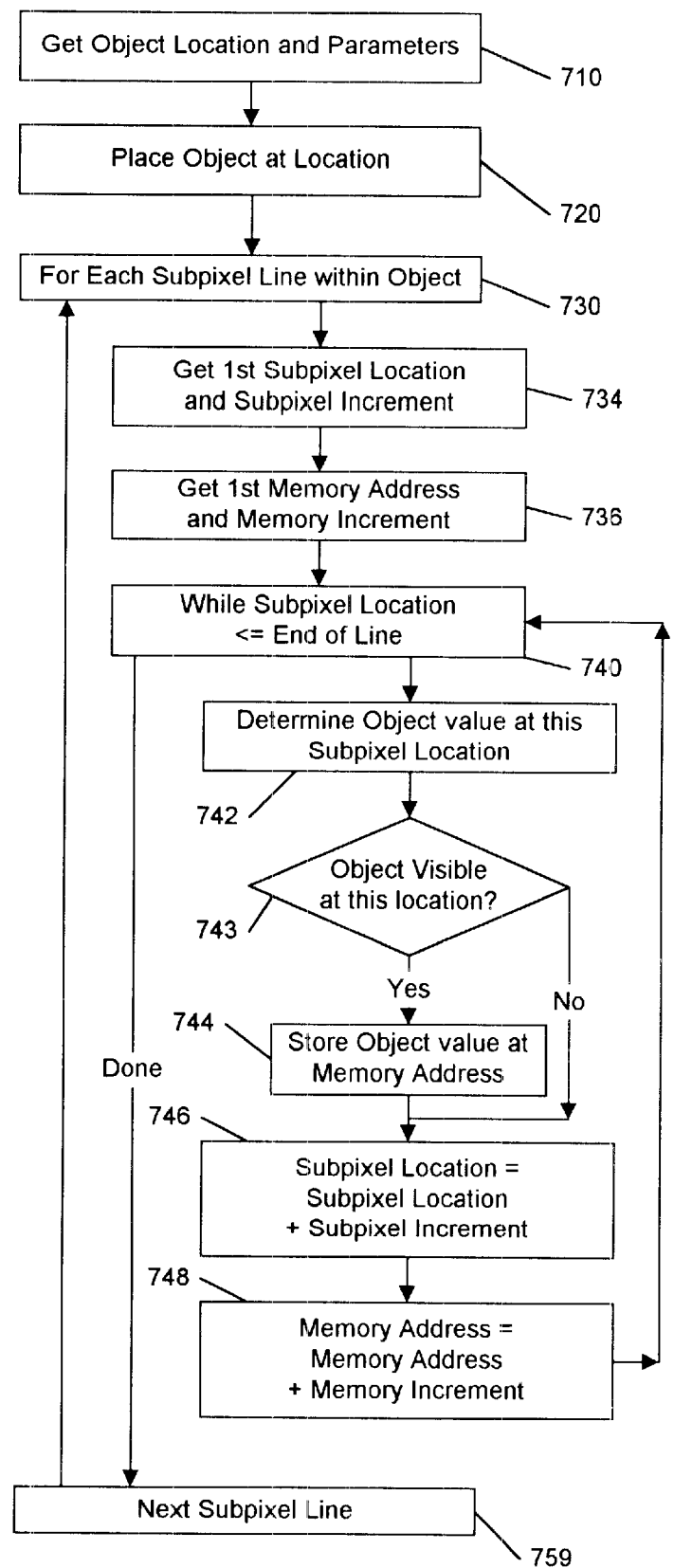
FIG. 9 illustrates another flowchart for non-uniform super-sampling in accordance with this invention.

Often, the rendering of objects is effected on a line-by-line basis, rather than the pixel-by-pixel basis illustrated in the flowchart of FIG. 7. FIG. 9 illustrates a method of effecting a super-sampling in accordance with this invention based on a line-by-line processing of objects. Blocks 710 and 720 of FIG. 9 determine the object's placement relative to the pixels. At 725, the edges of the object are assessed to determine the extent of the object relative to each line of pixels. Because the super-sampling is being effected at a subpixel resolution, the loop 730–759 processes each line of subpixels. That is, for example, in FIG. 2B, each row 210, 212, etc. will be processed sequentially via the loop 730–759. Based upon the super-sampling pattern, the first super-sampled subpixel of the subpixel line that is within the object is determined, at 734. Also determined at 734 is the subpixel increment, the number of subpixels between super-samples on the line. For example, in FIG. 2B, the number of subpixels between super-samples is four. The flowchart of FIG. 9 assumes a consistent sampling rate (equal to M, the number of subpixels, divided by N, the number of super-samples) in the horizontal direction for each line, thereby allowing for the use of a super-sampling subpixel increment. If the super-sampling pattern does not exhibit a consistent sampling rate, each super-sample subpixel location will need to be determined explicitly, as in the flowchart of FIG. 7. A memory address associated with the first super-sample within the object is determined at 736. This first address, in a preferred embodiment, will be based on the pixel location and an index to the particular super-sample, as in the flowchart of FIG. 7. In this manner, each subsequent super-sample of a particular pixel will be located in the same area of memory, even though the processing of each subpixel of each pixel will not occur immediately sequentially. That is, a subpixel line may contain K super-samples, corresponding to K pixels, within the extents of the subpixel line. These K pixels will be processed before the super-samples on the next subpixel line are processed. By basing the most significant bits of the memory address on the pixel location, and the least significant bits on the super-sample index, the super-samples from the same pixel will be located in the same memory area. Also determined at 736 is a memory address increment, which is based upon the number of super-samples per pixel, thereby allocating space for each of the super-samples of each pixel. Each super-sampled subpixel that lies along the subpixel line within the extents of the object is processed in the loop 740–748. If the subpixel is within the extents of the subpixel line that is within the extents of the object, the object value at the subpixel location is determined, at 742. If the object is visible 743 at this subpixel location, the object value is stored as the super-sampled value at the memory address, at 744. The subpixel location is incremented by the subpixel increment, at 746, and the memory address is incremented by the memory increment, at 748. Using these incremented subpixel locations and memory addresses, each subsequent subpixel location along the current subpixel line is processed, until the subpixel location is no longer within the object, and the next subpixel line is processed, at 759. A flowchart similar to that of FIG. 8 is employed to determine the average pixel value, based upon the stored object values at each subpixel location corresponding to each pixel.

Figure 10:
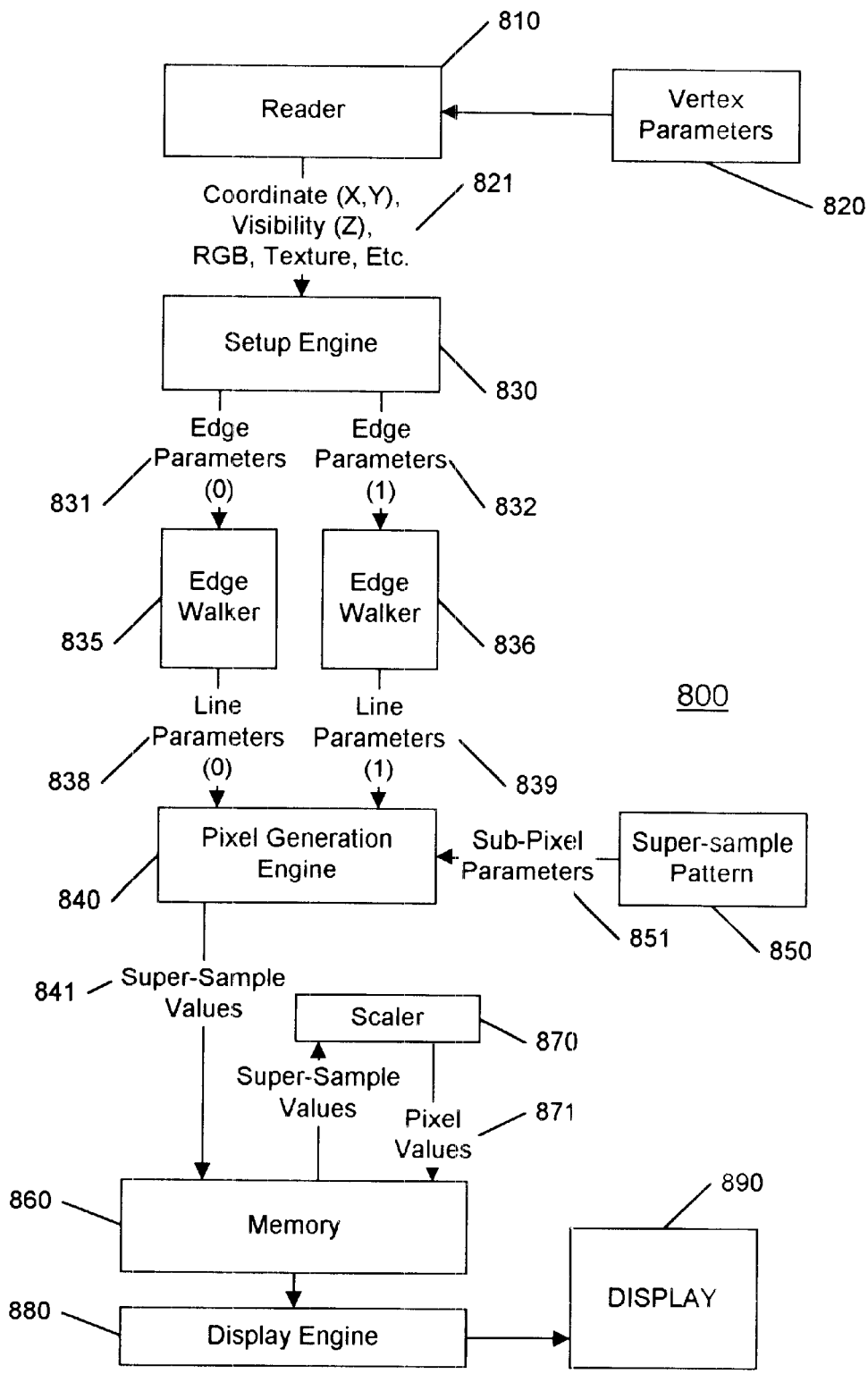
FIG. 10 illustrates a block diagram of an apparatus for antialiasing using a non-uniform pixel sampling pattern in accordance with this invention.

FIG. 10 illustrates a block diagram of an apparatus for effecting non-uniform sampling and processing of super-samples in accordance with this invention that is based on a line-by-line super-sampling as outlined with respect to the flowchart of FIG. 9. The apparatus 800 includes a reader 810 for reading vertex parameters 820 that are associated with each object, a setup engine 830 for determining the edges of each object, and edge walkers 835, 836 that determine the parameters associated with each line that extends between the edges of the object. As is common in the art, an image is partitioned into objects that are defined with respect to their vertices, and an object's particular values within the area bounded by its vertices are determined by an interpolation of the object's values at its vertices. The reader 810 provides vertex parameters 821 corresponding to an object to the setup engine 830. These vertex parameters 821 include the coordinates of the object, as well as the values of the object, such as its color, texture, and visibility, at each of its vertices. Based on these vertex parameters 821, the setup engine 830 determines each edge of the object, and the parameters 831, 832 associated with each edge, including the values of the object along these edges. These object values are algorithmically encoded, for example by encoding an initial value and a derivative, or increment, value. Based on the edge parameters 831, 832, the edge walkers 835, 836 determine the parameters 838, 839 associated with each line that extends from edge to edge of the object.

The line parameters 838, 839 are provided to a pixel generation engine 840. These line parameters 838, 839 include the location of the start and end of each line, and the object values at these start and stop boundaries, also encoded as algorithmic factors such as an initial value and an incremental factor. To minimize processing and memory requirements, the aforementioned determinations are based on a pixel resolution. That is, the edges parameters 831, 832, and line parameters 838, 839 are defined with respect to pixel locations, rather than subpixel locations. The pixel generation engine 840 uses the super-sampling pattern 850 to determine the appropriate subpixel parameters 851 to effect the desired super-sampling of each subpixel line. As discussed with regard to the flowchart of FIG. 9, in the preferred embodiment, the subpixel parameters 851 include the location of the first subpixel after the start of the subpixel line, and the subpixel sampling increment. The pixel generation engine 840 generates super-sampled values 841 at each of the super-sampled subpixel locations, based on the subpixel parameters 851, and stores each super-sample value 841 in a memory 860. Each pixel has an associated X and Y coordinate, and the super-sample pattern provides an X and Y offset to each of these coordinates. By basing the most significant bits of a memory address on the pixel X and Y coordinates, and the least significant bits of the memory address on each super-sample's X and Y offsets, the super-sample values associated with each pixel will be located in the same area of memory.

After the objects corresponding to the image are processed and each super-sample value 841 is stored in memory 860, a scaler 870 determines and stores each pixel's value 871, based upon the super-sample values 841, as discussed with respect to the flowchart of FIG. 8. Because the super-sample values associated with each pixel are stored in the same area of memory, this processing of the super-sample values 841 to determine each pixel's value 871 can be efficiently performed using convention block memory access techniques. A display engine 880 accesses the stored pixel values 871 to produce pixel data suitable for rendering on a display 890.

The foregoing discussion has described a method and apparatus for anti-aliasing that reduces the memory and processing required for high-resolution subpixel sampling, and minimizes the processing and memory access required to determine and store the resultant pixel value based on the super-samples associated with each pixel. The foregoing merely illustrates the principles of the invention. The apparatus and methods discussed above may be implement in hardware, software, or a combination of both. For example, the setup engine 830 and edge walkers 835, 836 of FIG. 10 may be software or firmware programs or algorithms, and the pixel generation engine 840 may be a hardware state machine that produces super-sample values based upon the line parameters 838, 839 provided by these programs. Similarly, the super-sampling in accordance with this invention has been discussed with regard to graphic objects that are represented by vertex data, although the principles presented herein are equally applicable to the super-sampling of continuous video and motion images as well. It will thus be appreciated that those skilled in the art will be able to devise various arrangements which, although not explicitly described or shown herein, embody the principles of the invention and are thus within its spirit and scope.

We claim:

1. A method for antialiasing, comprising the steps of:

providing a set of N super-samples of object values corresponding to a pixel having a subpixel resolution that provides for m subpixels of the pixel, wherein N is less than M/2;

determining a pixel value associated with the pixel based on the set of N super-samples;

storing the set of N super-samples in a set of contiguous locations of a memory;

wherein each of the set of N-super samples, where N is less than M/2, has an associated X and Y offset; and each of the set of contiguous locations of the memory are based on the associated X and offsets of the each of the set of N super-samples.

2. The method of claim 1, wherein the set of N super-samples provides:

a first sampling frequency along a first direction that traverses an area that contains a plurality of pixels, and a second sampling frequency along a second direction that traverses the area; and wherein the first sampling frequency is substantially equal to the second sampling frequency when the first direction is perpendicular to the second direction.

3. The method of claim 1, wherein the M subpixels are arranged in an N x N array.

4. The method of claim 1, wherein:

the M subpixels are arranged in a 4×4 array, and the set of N super-samples corresponds to at least one of the patterns shown in FIGS. 5A–5M and to at least one of a vertically mirrored pattern of FIGS. 5A–5M.

5. The method of claim 1, further including the steps of generating a plurality of K samples of object values corresponding to a subpixel line that includes a plurality of pixels, wherein each of the plurality of K samples corresponds to at least one of the set of N super-samples associated each of the plurality of pixels.

6. The method of claim 5, wherein the step of generating the plurality of K samples includes the steps of:

determining a location of a first subpixel corresponding to a first of the plurality of K samples, and incrementing the location for each subsequent sample of the K samples by an increment value that is based on M/N.

7. A method of processing pixel data, comprising the steps of:
- determining a plurality of sets of super-sampled object values corresponding to a plurality of pixel elements, wherein each set of super-sampled object values of the plurality of sets of super-sampled object values is associated with a corresponding one of the plurality of pixel elements and wherein each super-sample N corresponds to a pixel having a subpixel resolution that provides for M subpixels of the pixel, wherein N is less than M/2,
- storing each super-sampled object value of the each set of super-sampled object values in a memory,
- determining a pixel value for the each pixel element based on the each set of super-sampled object values that are stored in the memory;
- wherein each of the set of N super-samples, where N is less than M/2, has an associated X and Y offset, and
- each of the set of contiguous locations of the memory are based on the associated X and Y offsets of the each of the set of N super-samples.

8. The method of claim 7, wherein the step of determining the pixel value includes the steps of:
- accumulating a sum of the each super-sampled object value of the each set of super-sampled object values and
- determining the pixel value based on the sum.

9. The method of claim 7, wherein the each set of super-sampled object values corresponding to the each pixel element is determined by a subpixel resolution of the each pixel element.

10. The method of claim 7, wherein each set of super-sampled object values is stored in contiguous memory locations of the memory.

11. An antialiasing apparatus comprising:
- a subpixel sampler that receives object values corresponding to a plurality of pixel elements and produces therefrom a plurality of sets of N super-samples, each set of N super-samples of the plurality of sets of N super-samples is associated with a corresponding one of the plurality of pixel elements, and
- a scaler, operably coupled to the subpixel sampler, that produces a pixel value associated with each pixel element of the plurality of pixel elements based on the corresponding set of N super-samples;
- wherein each pixel element has a subpixel resolution that provides for M subpixels of the each pixel element of the plurality of pixel elements, and wherein N is less than M/2; each of the set of N-super samples where N is less than M/2 has an associated X and Y offset, and each of the set of contiguous locations of the memory are based on the associated X and Y offsets of the each of the set of N super-samples.

12. The antialiasing apparatus of claim 11, wherein the subpixel sampler produces the set of N super-samples such that
- a first line that traverses an area corresponding to the pixel element is sampled at a first sampling frequency, and
- a second line that traverses the area corresponding to the pixel element is sampled at a second sampling frequency, and
- the first sampling frequency is substantially equal to the second sampling frequency when the first line is perpendicular to the second line.

13. The antialiasing apparatus of claim 11, wherein the M subpixels correspond to an N×N partitioning of each pixel element.

14. The antialiasing apparatus of claim 11, wherein:
- the M subpixels of the each pixel element are arranged in a 4×4 array, and
- the set of N super-samples corresponds to at least one of the patterns shown in FIGS. 5A–5M and to at least one of a vertically mirrored pattern of FIGS. 5A–5M.

15. The antialiasing apparatus of claim 11, further including
- a memory having a plurality of memory locations, operably coupled to the subpixel sampler, that stores each set of N super-samples in contiguous memory locations of the plurality of memory locations.

16. A graphics processing system comprising:
- a reader that reads vertex parameters and generates vertex data,
- a setup engine, operably coupled to the reader, that processes the vertex data to produce edge parameters,
- at least one edge walker, operably coupled to the setup engine, that processes the edge parameters to produce a plurality of sets of line parameters,
- a pixel generation engine, operably coupled to the at least one edge walker, that provides a plurality of super-sample values corresponding to each set of line parameters of the plurality of sets of line parameters, each super-sample value of the plurality of super-sample values being based on a set of N super-samples from a plurality of M subpixels, wherein N is less than M/2, the set of N super-samples from the plurality of M subpixels produces a non-uniform sampling of the M subpixels associated with a pixel,
- a memory, operably coupled to the span engine, that stores the each super-sample value of the plurality of super-sample values, and
- a scaler, operably coupled to the memory, that produces a plurality of pixel values based on the plurality of super-sample values.

17. The graphics processing system of claim 16, further including:
- a display engine, operably coupled to the memory, that produces pixel data corresponding the plurality of pixel values, and
- a display, operably coupled to the display engine, that renders an image based on the pixel data.

* * * * *